United States Patent
Johannsen et al.

(10) Patent No.: US 6,859,542 B2
(45) Date of Patent: Feb. 22, 2005

(54) METHOD OF PROVIDING A HYDROPHOBIC LAYER AND A CONDENSER MICROPHONE HAVING SUCH A LAYER

(75) Inventors: Ib Johannsen, Vaerlose (DK); Niels Bent Larsen, Copenhagen (DK); Matthias Mullenborn, Lyngby (DK); Pirmin Hermann Otto Rombach, Lyngby (DK)

(73) Assignee: Sonion Lyngby A/S, Lyngby-Tarbaek (DK)

( * ) Notice: Subject to any disclaimer, the term of this patent is extended or adjusted under 35 U.S.C. 154(b) by 84 days.

(21) Appl. No.: 09/867,606

(22) Filed: May 31, 2001

(65) Prior Publication Data

US 2002/0181725 A1 Dec. 5, 2002

(51) Int. Cl.$^7$ .............................................. H04R 25/00
(52) U.S. Cl. ...................... 381/174; 381/175; 381/191
(58) Field of Search ................................ 381/191, 113, 381/174, 175, 369; 367/181, 170; 361/283.1

(56) References Cited

U.S. PATENT DOCUMENTS

| | | | |
|---|---|---|---|
| 3,963,881 A | | 6/1976 | Fraim et al. ................ 179/111 |
| 4,910,840 A | * | 3/1990 | Sprenkels et al. .......... 381/174 |
| 5,367,429 A | | 11/1994 | Tsuchitani et al. |
| 5,658,698 A | | 8/1997 | Yagi et al. |
| 5,812,496 A | | 9/1998 | Peck ............................ 367/174 |
| 5,822,170 A | | 10/1998 | Cabuz et al. |
| 5,870,482 A | * | 2/1999 | Loeppert et al. ............ 381/174 |
| 6,134,333 A | | 10/2000 | Flagler ........................ 381/325 |
| 6,410,107 B1 | | 6/2002 | Sato et al. ................... 427/581 |
| 6,512,833 B2 | * | 1/2003 | Himori et al. ............... 381/174 |
| 2001/0000329 A1 | | 4/2001 | Sato et al. .................... 427/58 |

FOREIGN PATENT DOCUMENTS

| | | |
|---|---|---|
| EP | 0849082 A2 | 12/1997 |
| EP | 0899093 | 3/1999 |
| WO | WO 93/04495 | 3/1993 |
| WO | WO 9818855 | 5/1998 |

OTHER PUBLICATIONS

Ning et al., "Fabrication of a silicon micromachined capacitive microphone using a dry-etch process" Sensors and Actuators A 53 (1996) 237–242.

* cited by examiner

*Primary Examiner*—Curtis Kuntz
*Assistant Examiner*—Brian Ensey
(74) *Attorney, Agent, or Firm*—Harness, Dickey & Pierce, PLC

(57) ABSTRACT

A method of providing at least part of a diaphragm and at least a part of a back-plate of a condenser microphone with a hydrophobic layer so as to avoid stiction between said diaphragm and said back-plate. The layer is deposited via a number small of openings in the back-plate, the diaphragm and/or between the diaphragm and the back-plate. Provides a homogeneous and structured hydrophobic layer, even to small internal cavities of the microstructure. The layer may be deposited by a liquid phase or a vapor phase deposition method. The method may be applied naturally in continuation of the normal manufacturing process.

Further, a MEMS condenser microphone is provided having such a hydrophobic layer. The static distance between the diaphragm and the back-plate of the microphone is smaller than 10 $\mu$m.

21 Claims, 3 Drawing Sheets

METHOD OF PROVIDING A HYDROPHOBIC LAYER AND A CONDENSER MICROPHONE HAVING SUCH A LAYER

TECHNICAL FIELD

The present invention relates to a method of providing a hydrophobic layer to inner surfaces of a microstructure, in particular to inner surfaces of a condenser microphone, in order to avoid or prevent stiction between said inner surfaces.

BACKGROUND OF THE INVENTION

During the manufacturing as well as the operation of micro electromechanical systems (MEMS) devices, it is well known that failure due to adhesion between surfaces, e.g. between a moving surface and a substantially stationary surface, of the device may occur. This phenomenon is referred to as stiction. Stiction occurs with a larger probability in microstructures, typically having dimensions in the order of magnitude of 1–3 $\mu$m because the surface-to-volume ratio increases and surface forces, which are responsible for stiction, are correspondingly higher. Stiction may occur during or after the manufacturing process (i.e. during operation), after releasing of the microstructure where the surface tension of the rinse liquid is sufficiently strong to pull the suspending microstructures in contact with the substrate or another compliant or stiff counter surface, leading to permanent adhesion. This kind of stiction is referred to as 'after-release stiction'. Alternatively or additionally, stiction may occur after a successful release, e.g. when a microstructure is exposed to an environment of increased humidity or changing temperature. If the microstructure is first exposed to a humid environment, water vapour can condense and form a water film/droplets on the device surfaces. When the distance between the two surfaces decreases during device operation and the water film/droplets of one surface touch the counter surface, the two surfaces will stick together. This phenomenon may occur during the normal device operation and is therefore referred to as 'in-use stiction'. In-use stiction is in particular a problem in microstructures in which opposite surfaces, e.g. a diaphragm and a back-plate, form capacitors in combination with each other. This is, e.g., the case in condenser microphones and condenser pressure sensors.

The present invention is concerned with preventing stiction in microstructures, in particular in MEMS condenser microphones.

It is further known that the application of a hydrophobic layer to the surfaces in question can solve, or at least relieve, the problem. This has, e.g., been described in U.S. Pat. No. 5,822,170, in "Anti-Stiction Hydrophobic Surfaces for Microsystems" by P. Voumard, et al., CSEM scientific and technical report 1998, Neuchâtel, Switzerland, 26, in "The property of plasma polymerized fluorocarbon film in relation to $CH_4/C_4F_8$ ratio and substrate temperature" by Y. Matsumoto, et al., Proc. of Transducers '99, Jun. 7–10, 1999, Sendai, Japan, 34–37, in "Self-Assembled Monolayer Films as Durable Anti-Stiction Coatings for Polysilicon Microstructures" by M. R. Houston, et al. Solid-State Sensor and Actuator Workshop Hilton Head, South Carolina, Jun. 2–6, 1996, 42–47, in "Elimination of Post-Release Adhesion in Microstructures Using Conformal Fluorocarbon Coatings" by P. F. Man, et al., Journal of Microelectromechanical Systems, Vol. 6, No. 1, March 1997, in "Anti-Stiction Methods for Micromechanical Devices: A Statistical Comparison of Performance" by S. Tatic-Lucid, et al., Proc. of Transducers '99, Jun. 7–10, 1999, Sendai, Japan, 522–525, in "A New Class of Surface Modification for Stiction Reduction", by C.-H. Oh, et al., Proc. of Transducers '99, Jun. 7–10, 1999, Sendai, Japan, 30–33, in "Self-Assembled Monolayers as Anti-Stiction Coatings for Surface Microstructures", by R. Maboudin, Proc. of Transducers '99, Jun. 7–10, 1999, Sendai, Japan, 22–25, and in "Anti-Stiction Silanization Coating to Silicon Micro-Structures by a Vapor Phase Deposition Process", by J. Sakata, et al., Proc. of Transducers '99, Jun. 7–10, 1999, Sendai, Japan, 26–29.

The references above describe depositions of a hydrophobic layer, e.g. a self-assembled monolayer (SAM) onto surfaces of the microstructure, the microstructure preferably being made from a silicon material, such as a Si-wafer or poly-silicon layers. The deposition is primarily performed by successively positioning the microstructure in various liquids. However, in "Anti-Stiction Silanization Coating to Silicon Micro-Structures by a Vapor Phase Deposition Process", by J. Sakata, et al., Proc. of Transducers '99, Jun. 7–10, 1999, Sendai, Japan, 26–29, the deposition is performed by a vapour phase deposition process (dry process), in which the microstructure is positioned in a container containing a gas or a vapour. The advantage of this process is that it is possible to obtain a homogeneous coating, even inside a complicated microstructure, and even inside a space with narrow gaps. However, it has turned out that using a vapour phase deposition process results in a hydrophobic layer having a surface which is less structured than the surface of a hydrophobic layer which has been deposited using a liquid phase deposition process. This is due to the fact that the molecules forming the monolayer form cross bindings in addition to forming bonds to the surface. With a certain probability, this reaction already happens in the gas-phase. Therefore, molecule clusters are deposited that cannot chemically bind to the surface anymore or that can only partly chemically bind to the surface. This results in a less structured layer and therefore rough surface, which makes it possible for water droplets to attach to the surface, even though the material surface otherwise would be highly hydrophobic. Thus, the hydrophobic property of the surfaces is partly or possibly totally reduced. Furthermore, the process described in this reference requires special equipment. In addition, the sacrificial layer has to be removed and the structure has to be released before the hydrophobic layer can be applied. The release process is a critical process with a certain yield, which will reduce the total yield of the manufacturing process and increase the manufacturing costs. The gas phase deposition also needs pumping steps, which bear the risk for stiction due to fast pressure transients. Therefore, the coating process performed from a liquid material is preferred.

It is, thus, desirable to be able to provide a method for providing a hydrophobic layer to the inner parts of a microstructure in such a way that the hydrophobic property of the layer is maintained.

SUMMARY OF THE INVENTION

It is an object of the present invention to provide a method of providing a microstructure with a hydrophobic layer in such a way that a very structured layer may be applied to microstructures, even to microstructures having internal spaces with narrow gaps.

It is a further object of the present invention to provide a method of providing a microstructure with a hydrophobic layer, which may be introduced as a natural part of the manufacturing process for the microstructure.

It is an even further object of the present invention to provide a method of providing a microstructure with a hydrophobic layer, which minimises the number of production steps of the manufacture of the microstructure.

It is an even further object of the present invention to provide a condenser microphone in which the stiction phenomenon is avoided.

According to the present invention the above and other objects are fulfilled by a method of providing at least part of a diaphragm and at least a part of a back-plate of a condenser microphone with a hydrophobic layer so as to avoid stiction between said diaphragm and said back-plate, said method comprising the steps of providing a condenser microphone comprising a diaphragm and a back-plate, wherein an inner surface of said diaphragm forms a capacitor in combination with an inner surface of said back-plate, and providing the hydrophobic layer onto the inner surfaces of the diaphragm and the back-plate through a number of openings, said openings being in the back-plate, in the diaphragm and/or between the diaphragm and the back-plate.

The condenser microphone may be a microphone for recording ordinary sound waves, e.g. propagating in atmospheric air. However, it may additionally or alternatively be a microphone which is adapted to perform measurements in a hostile environment, e.g. in a humid, extremely hot, or extremely cold environment. In this case the condenser microphone needs to be able to function under such extreme conditions. It is especially important that water vapour (or other vapours which the microphone may be in contact with) can not condense easily on the inner parts of the microphone, since this would lead to water droplets and a temporary stiction between the diaphragm and the back-plate, which in turn causes the functionality of the microphone to decrease. If the water in the air gap dries, the back-plate and the diaphragm have to separate again. According to the invention such condensation is prevented or at least reduced by providing the diaphragm and at least part of the back-plate with a hydrophobic layer.

The microphone is preferably a MEMS microphone, i.e. at least the diaphragm and/or the back-plate are manufactured using semiconductor technology.

An inner surface of the diaphragm and an inner surface of the back-plate of the microphone form a capacitor. Since the diaphragm is movable in relation to the back-plate, which is substantially stationary, the capacitance of said capacitor depends on the immediate distance between the diaphragm and the back-plate.

The hydrophobic layer is provided onto the inner surfaces of the diaphragm and the back-plate, respectively, through a number of openings. The openings are positioned in the back-plate, in the diaphragm and/or between the diaphragm and the back-plate. Thus, the coating material may be applied to inner surfaces of the microphone in a homogeneous and structured manner, even if the microphone comprises small cavities to which it would otherwise be difficult to gain access. Furthermore, this coating process may advantageously be applied in continuation of the normal manufacturing procedure. Thus, it is neither necessary to dry the microphone after the normal manufacturing steps before the coating process, nor to use special equipment for the process. This renders the coating process of the present invention cost effective and easy to perform, which in turn makes it very attractive for commercial purposes.

For the gas-phase deposition but even more for the liquid deposition the dynamics of the deposition processes have to be taken into account. It is very difficult to deposit the coating material into the air gap of a MEMS microphone with typical lateral dimensions (back-plate or diaphragm radius and side length, respectively) of 0.5 mm to 2 mm and typical air gap heights of only 0.3 $\mu$m to 10 $\mu$m. These high aspect ratios reduce the deposition rate and make the process very time consuming and inefficient. In order to get a direct access to the middle part of the air gap, the deposition has to be performed through a number of openings in the back-plate, in the diaphragm, and/or gaps at the periphery of the back-plate and the diaphragm. This makes the process faster and thus more cost effective.

At least the inner surfaces of the diaphragm and the back-plate may be made from a hydrophilic material. If the inner diaphragm surface and/or the inner surface of the back-plate are hydrophilic, this property would cause stiction if water would dry out the air gap volume. The term 'hydrophilic material' could be interpreted as a material having a surface which shows with water a contact angle below 90°. Thus, water droplets may easily form on a hydrophilic surface. Materials that form hydrophilic surfaces may, e.g., be silicon, poly-silicon, $SiO_2$, $Si_xN_y$ (such as $Si_3N_4$), and/or any other suitable material.

The inner surface of the diaphragm and/or the inner surface of the back-plate may, however, possess hydrophobic properties which need to be improved.

In one embodiment of the present invention the smallest dimension of each of the openings does not exceed 10 $\mu$m, such as not exceeding 7 $\mu$m, such as not exceeding 5 $\mu$m, such as not exceeding 3 $\mu$m, such as not exceeding 1 $\mu$m, such as not exceeding 0.7 $\mu$m, such as not exceeding 0.5 $\mu$m. The smallest dimension of each of the openings may, thus, be approximately 3 $\mu$m, such as approximately 2 $\mu$m, approximately 4 $\mu$m, approximately 2.5 $\mu$m, approximately 3.5 $\mu$m, approximately 2.7 $\mu$m, or approximately 3.2 $\mu$m. The smallest dimension of each of the openings may, alternatively, be larger. The smallest dimension of each of the openings may also be even smaller.

One or more of the openings may be shaped as substantially circular hole(s), in which case the smallest dimension of each opening may refer to the diameter of such a hole. Alternatively or additionally, one or more of the openings may be shaped as elongated groove(s), in which case the smallest dimension of each opening may refer to the transversal size of such a groove. Alternatively or additionally, one or more of the openings may be shaped as a square, a rectangle, or any other polygonal shape, and/or one or more of the openings may be shaped in any other suitable way.

The static distance between the diaphragm and the back-plate is preferably smaller than 10 $\mu$m, such as smaller than 7 $\mu$m, such as smaller than 5 $\mu$m, such as smaller than 3 $\mu$m, such as smaller than 1 $\mu$m, such as smaller than 0.7 $\mu$m, such as smaller than 0.5 $\mu$m, such smaller than 0.3 $\mu$m, such as approximately 0.2 $\mu$m. The static distance between the diaphragm and the back-plate may, thus, be approximately 1 $\mu$m, such as approximately 0.5 $\mu$m, approximately 0.7 $\mu$m, approximately 0.9 $\mu$m, approximately, 1.2 $\mu$m, or approximately 1.5 $\mu$m.

The term 'static distance' should be interpreted as the distance between the diaphragm and the back-plate when the diaphragm is in a static equilibrium. In this case inner surfaces of the diaphragm and the back-plate will normally be approximately parallel to each other, and the 'static distance' should be understood as the distance between these inner surfaces along a direction being normal to the two parallel inner surfaces.

The step of providing the hydrophobic layer may be performed by chemical binding of the hydrophobic layer to poly-silicon, silicon oxide, silicon nitride and/or silicon-rich silicon nitride surfaces, and forming hydrophobic chains from said hydrophobic layer, said hydrophobic chains pointing away from the surface to which the binding is formed.

In this case at least the diaphragm and/or the back-plate may be manufactured from one or more of the above mentioned materials.

The step of providing the hydrophobic layer may comprise the steps of forming a molecule monolayer, and cross linking between molecules and multi binding to surfaces In this embodiment the provided hydrophobic layer is very durable and stable.

The hydrophobic layer base material may comprise an alkylsilane, such as:

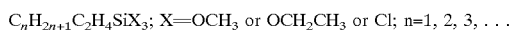

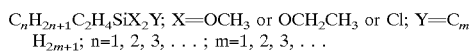

or

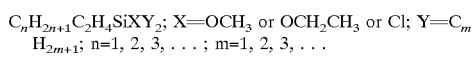

Alternatively, the hydrophobic layer base material may comprise a perhaloalkylsilane, e.g. a perfluoroalkylsilane, such as

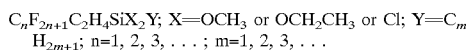

or

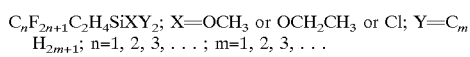

The method may further comprise the step of positioning at least part of the diaphragm and at least part of the back-plate in a liquid comprising a liquid phase of the hydrophobic layer material to be provided on the inner surfaces. In this embodiment the hydrophobic layer is provided using a liquid phase deposition method. As mentioned above, this usually results in a very structured monolayer being deposited.

Alternatively, the method may further comprise the step of positioning at least part of the diaphragm and at least part of the back-plate in a container comprising a gaseous phase of the hydrophobic layer base material to be provided on the inner surfaces. The container may alternatively or additionally comprise a vapour of the hydrophobic layer base material. In this embodiment the hydrophobic layer is provided using a vapour deposition method.

Preferably, the hydrophobic layer being provided has a contact angle for water being between 90° and 130°, such as between 100° and 110°.

The hydrophobic layer being provided is preferably stable at temperatures between −40° C. and 130° C., such as temperatures between −30° C. and 110° C. It is most preferably stable at temperatures up to at least 400° C. for at least 5 minutes.

According to another aspect the present invention provides a condenser microphone comprising a diaphragm and a back-plate, wherein an inner surface of said diaphragm forms a capacitor in combination with an inner surface of said back-plate, said back-plate and/or said diaphragm is/are provided with a number of openings, and said inner surfaces being provided with a hydrophobic layer, and wherein the static distance between said diaphragm and said back-plate is smaller than 10 $\mu$m.

The condenser microphone according to the invention is thus a microstructure in which inner surfaces of a narrow space or cavity (i.e. the space or cavity defined by the inner surfaces of the back-plate and the diaphragm, respectively) have been provided with a hydrophobic layer. The hydrophobic layer has most preferably been provided via the number of openings, i.e. according to the method described above.

At least the inner surfaces of the diaphragm and the back-plate may be made from a hydrophilic material as described above. However, the inner surface of the diaphragm and/or the inner surface of the back-plate may, to some extend, possess hydrophobic properties which it is desirable to improve.

Preferably, the smallest dimension of each of the openings does not exceed 10 $\mu$m, such as not exceeding 5 $\mu$m, such as not exceeding 1 $\mu$m, such as not exceeding 0.5 $\mu$m. The smallest dimension of each of the openings may, thus, be approximately 3 $\mu$m.

The hydrophobic layer base material may comprise an alkylsilane, such as

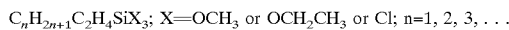

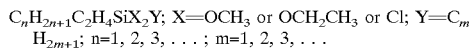

or

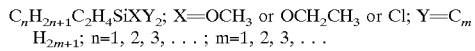

Alternatively, the hydrophobic layer base material may comprise a perhaloalkylsilane, e.g. a perfluoroalkylsilane, such as

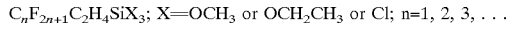

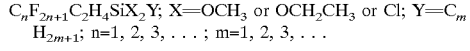

or

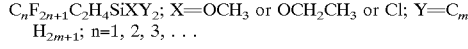

The static distance between the diaphragm and the back-plate may be smaller than 5 $\mu$m, such as smaller than 1 $\mu$m, such as smaller than 0.5 $\mu$m, such as smaller than 0.3 $\mu$m. The static distance between the diaphragm and the back-plate may, thus, be approximately 1 $\mu$m, such as approximately 0.9 $\mu$m.

The hydrophobic layer preferably has a contact angle for water being between 90° and 130°, such as between 100° and 110°, and it is preferably stable at temperatures between −40° C. and 130° C., such as temperatures between −30° C. and 110° C. Most preferably, the hydrophobic layer is stable at temperatures up to at least 400° C. for at least 5 minutes.

DETAILED DESCRIPTION OF THE DRAWINGS

Figure 1:
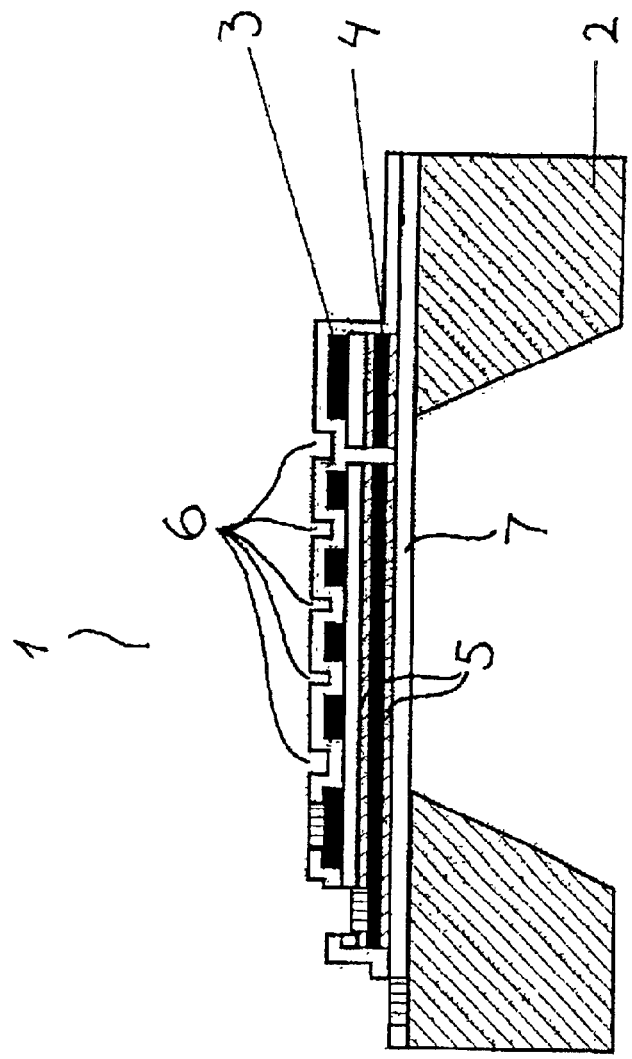
FIG. 1 is a schematic drawing of a condenser microphone cross section during a manufacturing process, before sacrificial layer $SiO_2$ etching.
Figure 2:
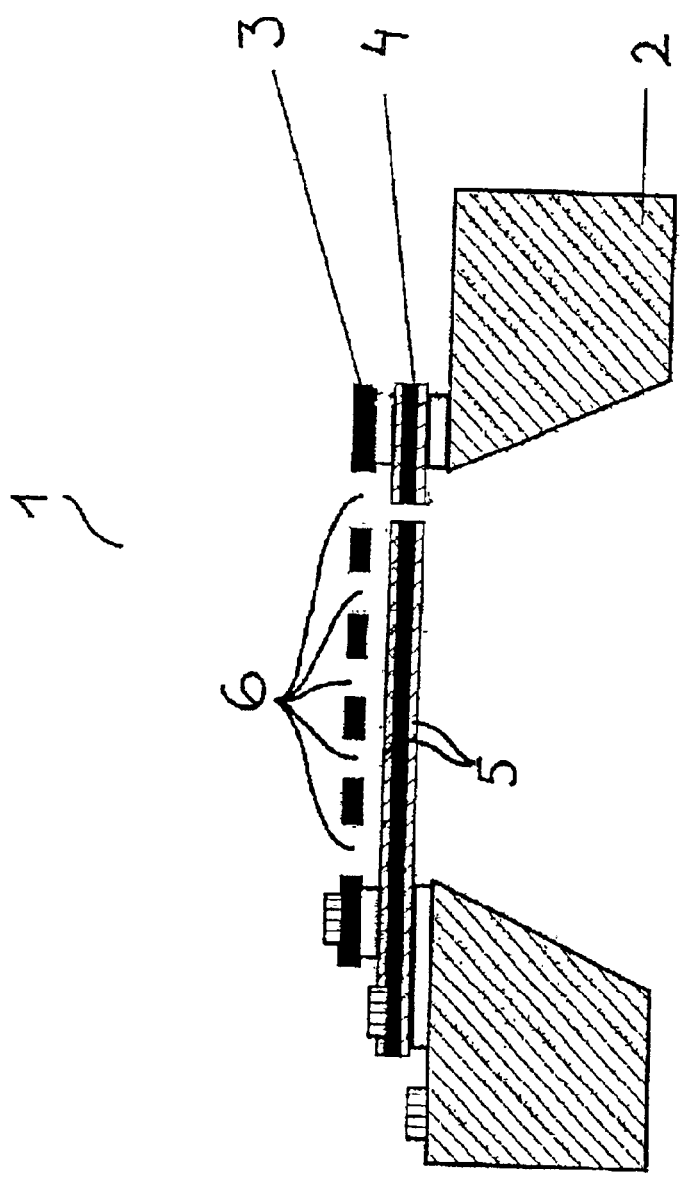
FIG. 2 shows the condenser microphone cross section of FIG. 1, but after sacrificial layer $SiO_2$ etching.
Figure 3:
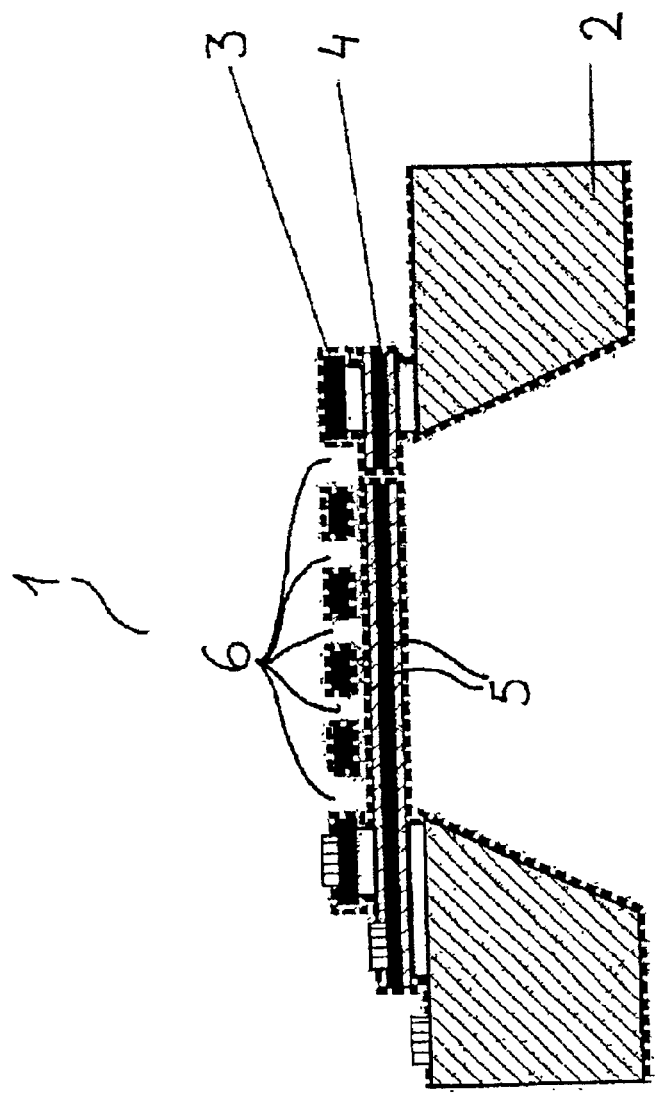
FIG. 3 shows the condenser microphone cross section of FIGS. 1 and 2, after a hydrophobic coating has been applied.

FIGS. 1–3 illustrate the last part of a manufacturing process for a condenser microphone 1, including applying a hydrophobic coating to the microphone 1, the process being performed in accordance with the present invention.

The microphone 1 comprises a supporting structure 2, a back-plate 3, and a diaphragm 4. The supporting structure 2 is preferably made from a silicon substrate, the back-plate 3 is preferably made from poly-silicon, and the diaphragm 4 is preferably made from a poly-silicon/silicon-rich silicon nitride (layers 5) sandwich. The back-plate 3 is provided with a number of openings 6 through which the hydrophobic coating material may pass (see below). In the Figures there is shown five openings 6 for illustrative purposes. However, in reality the number of openings 6 occurring in a back-plate of $1 \times 1$ mm$^2$ will typically be in the order of 30,000. The diaphragm 4 is movable by a sound pressure and the back-plate 3 is substantially stationary, and in combination the diaphragm 4 and the back-plate 3 form a capacitor, the capacitance of which depends on the immediate distance between the two.

During the manufacturing of the microphone 1, a sacrificial layer 7 is applied to the microphone 1 in order to define the air gap height. The sacrificial layer 7 is preferably made from $SiO_2$, SiON or SiGeON. When the process steps which are normally applied have been carried out, the sacrificial layer 7 needs to be at least partially removed in order to allow the diaphragm 4 to move in relation to the back-plate 3. This sacrificial layer 7 may be removed by an etching process using HF (hydrofluoric acid) followed by a water rinse. FIG. 1 shows the microphone 1 before the sacrificial etching process is applied, and FIG. 2 shows the microphone 1 after the sacrificial etching process is applied. It is clear that the sacrificial layer 7 which is present in FIG. 1 has been removed from the microphone 1 of FIG. 2.

The microphone 1 is then cleaned by means of a so-called 'piranha clean'. The microphone 1 is dipped into a container containing a liquid of three parts $H_2O_2$ and seven parts $H_2SO_4$. Subsequently, the microphone 1 is water rinsed.

After the water rinse the microphone 1 is transferred into a container containing isopropanol (IPA, 2-propanol) in order to perform an IPA rinse. This step is repeated twice, i.e. the microphone 1 is, in turn, transferred into two other containers containing a fresh IPA solution. Subsequently, the microphone 1 is transferred into a container containing heptane in order to perform a heptane rinse. This step is also repeated twice as described above.

Next, the actual coating step of is performed by means of silane deposition. This is done by transferring the microphone to a container containing heptane with perhaloalkylsilanes, e.g. perfluoroalkylsilanes, or alkylsilanes, i.e. the actual hydrophobic coating material. Due to the openings 6 provided in the back-plate 3, the coating material may enter the inner parts of the microphone 1, i.e. the parts defined by the opposite surfaces of the back-plate 3 and the diaphragm 4, respectively. The coating material may, thus, be deposited to the surfaces of these inner parts, such as the inner surfaces of the back-plate 3 and the diaphragm 4, respectively. Furthermore, since the deposition is performed using a liquid phase deposition method, the resultant hydrophobic layer is a structured monolayer. Thus, the hydrophobic properties of the material are maintained at a high level.

Subsequently, first the heptane rinse steps and then the IPA rinse steps described above are repeated. Then the microphone 1 is water rinsed, dried, and post-baked in order to stabilise the coating.

The IPA rinse steps, the heptane rinse steps, the coating process and/or the water rinse steps described above may, alternatively, be performed by continuously renewing the solution in the container, thus avoiding to transfer the microphone 1 from one container to another during the rinse step in question. This reduces the exposure to air of the microphone 1 and, thus, the probability of drying before the coating process is finished. This makes the coating process easier to handle, i.e. more attractive for commercial purposes.

FIG. 3 shows the microphone 1 after the coating process described above has been performed. The resulting coating is shown as a dotted line.

The coating process as described above may advantageously be performed in continuation of the normal manufacturing process.

Thus, a method of providing at least part of a diaphragm and at least a part of a back-plate of a condenser microphone with a hydrophobic layer has been provided which is easy to perform, and, thus, attractive for commercial purposes. Furthermore, a condenser microphone has been provided in which in-use stiction between the diaphragm and the back-plate is avoided, or at least prevented to a great extend.

What is claimed is:

1. A condenser microphone comprising a diaphragm and a back-plate, wherein an inner surface of said diaphragm forms a capacitor in combination with an inner surface of said back-plate, said back-plate and/or said diaphragm is/are provided with a number of openings, and said inner surface of the back-plate and said inner surface of the diaphragm being provided with a hydrophobic layer, and wherein the static distance between said diaphragm and said back-plate is smaller than 10 $\mu$m.

2. A condenser microphone according to claim 1, wherein at least the inner surfaces of the diaphragm and the back-plate are made from a hydrophilic material.

3. A condenser microphone according to claim 1, wherein the smallest dimension of each of the openings does not exceed 10 $\mu$m.

4. A condenser microphone according to claim 3, wherein the smallest dimension of each of the openings does not exceed 5 $\mu$m.

5. A condenser microphone according to claim 4, wherein the smallest dimension of each of the openings does not exceed 1 $\mu$m.

6. A condenser microphone according to claim 5, wherein the smallest dimension of each of the openings does not exceed 0.5 $\mu$m.

7. A condenser microphone according to claim 4, wherein the smallest dimension of each of the openings is approximately 3 $\mu$m.

8. A condenser microphone according to claim 1, wherein the hydrophobic layer base material comprises an alkylsilane.

9. A condenser microphone according to claim 1, wherein the hydrophobic layer base material comprises a perhaloalkylsilane.

10. A condenser microphone according to claim 1, wherein the static distance between the diaphragm and the back-plate is smaller than 5 $\mu$m.

11. A condenser microphone according to claim 10, wherein the static distance between the diaphragm and the back-plate is smaller than 1 $\mu$m.

12. A condenser microphone according to claim 11, wherein the static distance between the diaphragm and the back-plate is smaller than 0.5 µm.

13. A condenser microphone according to claim 12, wherein the static distance between the diaphragm and the back-plate is smaller than 0.3 µm.

14. A condenser microphone according to claim 11, wherein the static distance between the diaphragm and the back-plate is approximately 0.9 µm.

15. A condenser microphone according to claim 1, wherein the hydrophobic layer has a contact angle for water being between 90° and 130°.

16. A condenser microphone according to claim 15, wherein the hydrophobic layer has a contact angle for water being between 100° and 110°.

17. A condenser microphone according to claim 1, wherein the hydrophobic layer is stable at temperatures between −40° C. and 130° C.

18. A condenser microphone according to claim 17, wherein the hydrophobic layer is stable at temperatures between −30° C. and 110° C.

19. A condenser microphone according to claim 1, wherein the hydrophobic layer is stable at temperatures up to at least 400° C. for at least 5 minutes.

20. A condenser microphone comprising a diaphragm and a back-plate, wherein an inner surface of said diaphragm forms a capacitor in combination with an inner surface of said back-plate, said back-plate and/or said diaphragm is/are provided with a number of openings, and said inner surface of the back-plate and/or said inner surface of the diaphragm being provided with a hydrophobic layer having a contact angle for water being larger than 90°, and wherein the static distance between said diaphragm and said back-plate is smaller than 10 µm.

21. A condenser microphone comprising:

a diaphragm;

a back-plate, wherein an inner surface of said diaphragm forms a capacitor in combination with an inner surface of said back-plate, said back-plate and/or said diaphragm being provided with a number of openings, wherein the static distance between said diaphragm and said back-plate is smaller than 10 µm; and a hydrophobic layer, provided on said inner surface of the back-plate and/or on said inner surface of the diaphragm.

* * * * *